United States Patent [19]

Mueller et al.

[11] 4,289,735

[45] Sep. 15, 1981

[54] PROCESS FOR THE PRODUCTION OF ALUMINUM CHLORIDE

[75] Inventors: Hans P. Mueller, Magden; Hanspeter Alder, Flurlingen, both of Switzerland; Gerhard Zhuber-Okrog, Rheinfelden, Fed. Rep. of Germany

[73] Assignee: Swiss Aluminium Ltd., Chippis, Switzerland

[21] Appl. No.: 117,462

[22] Filed: Feb. 1, 1980

[30] Foreign Application Priority Data

Feb. 16, 1979 [CH] Switzerland .......................... 1512/79
Feb. 16, 1979 [CH] Switzerland .......................... 1513/79

[51] Int. Cl.$^3$ ............................. C01F 7/56; C01F 7/60
[52] U.S. Cl. ..................................... 423/136; 423/135; 423/137; 423/DIG. 16; 423/495; 423/496
[58] Field of Search ................................. 423/135–137, 423/DIG. 16, 495, 496; 75/111, 112

[56] References Cited

U.S. PATENT DOCUMENTS

| | | | |
|---|---|---|---|
| 3,812,241 | 5/1974 | Piccolo et al. | 423/135 |
| 3,842,163 | 10/1974 | Russell et al. | 423/496 |
| 3,939,247 | 2/1976 | Fougner | 423/135 |
| 4,105,752 | 8/1978 | Becker et al. | 423/136 |

*Primary Examiner*—Herbert T. Carter
*Attorney, Agent, or Firm*—Bachman and LaPointe

[57] ABSTRACT

The efficiency of a given reactor for the conversion of aluminum oxide bearing starting material by means of reducing and chlorinating gases or of carbon coated aluminum oxide bearing starting material by means of chlorinating gases in a solid/gas fluidized bed to yield aluminum chloride is improved by the addition of an inert, solid dilution agent to the bed. Whereas, as a result of the chemical reaction, the average particle size and bulk density of the reagent decreases in a batch process, and in a continuous process an equilibrium value is reached, the average particle size and the bulk density of the inert material remains unchanged. An initial average particle size of 60-80 microns proved successful; quartz, corundum, magnesium oxide of similar particle size and bulk density was added as dilution agent, and a gas flow rate of 2 to 30 cm/sec was attained along with quantitative conversion of the gaseous reagent. The increase in the space-time-yield of a fluidized bed reactor, measured by the conversion achieved before onset of breakthrough in the fluidized bed, amounted to 58 to 65%.

9 Claims, No Drawings

PROCESS FOR THE PRODUCTION OF ALUMINUM CHLORIDE

BACKGROUND OF THE INVENTION

The present invention relates to a continuous process for the production of aluminum chloride by the conversion of aluminum oxide bearing substances using reducing and chlorinating gases or gas mixtures in a fluidized bed containing a chemically and physically inert, solid dilution agent. The aluminum oxide bearing substances can be coated with carbon.

The method of producing aluminum chloride by the reduction and chlorination of aluminum oxide has been known for a long time and has increased in significance due to modern developments in the production of aluminum. There are several kinds of known chlorination processes of which the conversion of aluminum oxide bearing raw materials or pure alumina with a chlorinating and reducing gas mixture into the appropriate metal chloride is one of the best known. In that process pure alumina or aluminum oxide bearing raw materials is converted by means of chlorinating and reducing gases or mixtures of gases e.g. phosgene or chlorine/carbon monoxide, preferably at elevated temperatures (700°–1000° C.).

$$Al_2O_3 + 3CO + 3Cl_2 \rightleftharpoons 2AlCl_3 + 3CO_2 \quad (1)$$

$$Al_2O_3 + 3COCl_2 \rightleftharpoons 2AlCl_3 + 3CO_2 \quad (2)$$

In an early work, W. D. TREADWELL and L. TEREBESI recognized that the rate of the reaction between aluminum oxide and a reducing and chlorinating gas mixture depends, besides the composition of the latter, also on the form of the aluminum oxide employed (W. D. TREADWELL and L. TEREBESI, Helv. Chim. Acta 15 (1932), 1352–1362, viz., 1355 ff. and 1362). These authors subjected the alumina to a pretreatment comprising heating at 950°–1000° C. and varying the duration between 2 and 10 hours. At the reaction temperature of 550°–560° C., which they found to be optimum, the conversion of the best active forms of aluminum oxide was found to be 88% after 30 minutes treatment with phosgene, and 62% after treatment with chlorine/carbon monoxide.

The conversion of aluminum oxide bearing raw material with chlorinating gases or gas mixtures and carbon as reactant has also been thoroughly investigated. In this case the endothermic reaction:

$$Al_2O_3 + 3C + 3Cl_2 \rightleftharpoons 2AlCl_3 + 3CO \quad (3)$$

is to be considered as the main reaction which, in combination with the strongly exothermic secondary reaction given by equation (1), results in the likewise strongly exothermic overall reaction:

$$Al_2O_3 + 3/2C + 3Cl_2 \rightleftharpoons 2AlCl_3 + 3/2CO_2 \quad (4)$$

To carry through this process, the aluminum oxide bearing raw material such as pure alumina, clay, kaolin, bauxite etc. is coated or mixed with solid carbon and treated with a chlorinating gas e.g. sulphur chloride, phosgene, but in particular with chlorine and therefore chlorinated under reducing conditions. The carbon is in the form of pitch, tar, asphalt, bituminous coal or coke, whereby the porous products obtained by coking make the reaction with the gas containing chlorine. The reaction takes place below 1000° C. and is exothermic. The aluminum oxide bearing raw material is coated with carbon either by mixing mechanically with powdered carbon and bricketting the mixture (TREADWELL and TEREBESI, supra), or by treating the raw material with hydrocarbons in the gaseous, liquid or solid form, whereby the hydrocarbon is cracked or coked (see details of literature under H. B. Müller, Reduction Chlorination of Pure Alumina and Bauxite, Thesis ETH Zurich, 1976, p. 6).

The reaction of aluminum oxide with carbon and chlorine begins at 375°–385° C. and also depends strongly on the kind of pre-treatment given to the aluminum oxide used (TREADWELL and TEREBESI, supra).

Whereas the older processes involved the treatment of uniform pieces of calcined aluminum oxide in shaft or rotary furnaces with reducing and chlorinating gas mixtures, the modern, large scale industrial processes, almost without exception, exploit the many technical advantages offered by carrying out the reaction in a fluidized bed. Of these advantages it is the possibility of carrying out the process continuously which stands out as the most significant. For example, fine particulate alumina was treated in a fluidized bed at 500°–800° C. with chlorinating and reducing gases, whereby CO and $Cl_2$ were passed over a catalyst to form phosgene (German Pat. No. 948 972). In another case a fluidized bed process was combined with the use of an alkali-aluminum chloride melt (which acted catalytically) and the systematically optimized distribution of alumina particle sizes to achieve uniform operation of a three phase fluidized bed (German Pat. No. 1 061 757). In a further case using a fluidized bed process, the aluminum oxide bearing raw material was first brought into an active form with low residual moisture content and large specific internal surface area, and then converted with an appropriate gas or gas mixture (Swiss patent application No. 12713/74 by the same applicant).

Other known processes treat briquettes of a suitably pre-treated carbon coated aluminum oxide with the chlorinating gas or gas mixture in shaft or rotary furnaces, whereby the modern large scale processes, almost without exception, exploit the many technical advantages offered by carrying out the reaction in a fluidized bed. Of these advantages it is the possibility of carrying out the process continuously which stands out as the most significant. A mixture of aluminum oxide and low ash oil carbon (ash content below 2.5%) was therefore converted in a fluidized bed at 450°–600° C. However the reaction was guaranteed to take place smoothly without decomposition of the bed, only if the aluminum oxide and the oil carbon had similar particle sizes at the start of the reaction (German patent 1 237 995). In another process, in a first step at 750°–1000° C., a heavy oil was cracked on an aluminum oxide which had an internal surface area of at least 10 m²/g, until the particles were coated with 10–14 wt.% of carbon. In a second stage the carbon coated aluminum oxide was chlorinated at 450°–800° C. (German patent 22 44 041). In another process alumina was dehydrated at 800° C. to bring it into an active form having a specific surface area of 124 m²/g and a water content of less than 1 wt.%, then coated with carbon at 800° C. by cracking ethane, and finally chlorinated. For an 80% conversion of the alumina on the thermobalance a reaction time of 1.6 min was required at 800° C., 9.1 min at 700° C., and the start of the reaction was at 670° C. (H. P. Alder/H. Baiker/H. Geisser/W. Richarz, The Chlorination of Alumina, a Comparison of the Kinetics with different Reduction Agents, 108th AIME Meeting, February 1979).

If chemical reactions between solid substances and gases are carried out in fluidized beds, where the fluidized bed of solid particulate material is one of the reaction partners and the flowing gaseous medium is the other, the reaction parameters depend essentially on heat and material transport in this fluidized bed. To achieve optimum yield from the reaction therefore one must strive for a high heat transfer coefficient and optimum mechanical mixing of material and gas in the bed. To this end, the formation of channels in the bed should in particular be avoided, and the diameter of the bubbles formed should be as small as possible.

The fact that in fluidized bed technology one frequently employs a relatively large spectrum of particle sizes and, in particular a large proportion of relatively fine solid particles (less than approximately 50 microns in diameter), aiming to satisfy both requirements, is counter productive. This undesirable fact can be overcome, and the exchange of heat and material in such fluidized beds improved to a significant degree, by adding a solid component of large particle size to a bed of small particle size.

The effect of this measure on heat transport in the fluidized bed has been proved experimentally many times. The effect of gas flow rate on heat transport in fluidized beds of aluminum oxide of 11 microns average particle size was therefore investigated after the addition of coarser particles in the form of glass balls of average diameter of 200 microns to the bed. It was found that with increasing flow rate of gas, without any addition, resulted in no increase at all in the heat transfer number h of the bed; on the other hand the addition of 30 and 47% of coarser particles resulted in a steep increase and a plateau region approximately at the level of twenty times the initial value (M. BEARNS: Proceedings of the International Symposium on Fluidization, June 6–9, 1967, Eindhoven, ed. A. A. H. Drinkenburg, Amsterdam 1967, p. 407 ff., in particular FIG. 3).

With respect to mixing in the fluidized bed, trials with fine zinc particles to which coarser particles of quartz or glass were added showed that, as a result of the addition of the coarser particles, both the radial and the axial mixing coefficients between gas and solid in a fluidized bed can be significantly improved (BEARNS et al., p. 408).

It has often been confirmed that the addition of material of different particle sizes prevents the formation of channels in fluidized beds, and reduces significantly the size of the bubbles which counter good mixing (DE GROOT, supra. p. 359, BEARNS, supra. pp. 393, 408, ZUIDERWEG, supra. p. 740).

Using this knowledge as a basis, theoretical considerations have been made about the optimum composition of fluidized beds made up of particles of different size. The results can be summarized as follows: in an optimum two component system the diameter of the fine particles should be 22.5% of that of the coarse particles, and the weight of the finer particles should make up altogether 25% of the total weight of the mixture (H. TRAWINSKI, Chem.-Ing. Techn. 23, 416 (1951), 25, 201, 229 (1953), F. A. ZENZ Petrol. Refiner, 32, 123 (1953), 36 4-11 (1957). It has often been confirmed experimentally that there is such an optimum for the ratio of coarse and fine particles in a fluidized bed mixture (e.g. DE GROOT, Proceedings, supra. p. 740).

If a solid reagent is transformed by a gas or gas mixture in a fluidized bed, then knowledge gained from the experiment is usually in the following form. Normally, in such gas-solid reactions the following limiting conditions have to be met:

(1) First, during the reaction, an excess of solid reagent over the gaseous reagent should be maintained so that the largest possible conversion and therefore a high utilization factor of the latter is assured. This depends on the kinetics and possibly further properties of the reaction in question to be carried out.

(2) Secondly, the gas flow rate in the fluidized bed reactor should not exceed a value $u_t$ at which the solid reagent is carried i.e. blown out of the bed. Maintaining the flow rate is particularly difficult in those cases in which this reagent has a wide spectrum of grain sizes and masses, and as a result of the chemical conversion process where the mass and/or size of the individual particles become smaller and the spectrum of particle sizes becomes even larger. Usually a compromise is reached with respect to this limiting condition, and the small amounts of unreacted material which is possibly removed by the gas stream are removed from the waste gas and fed back into the reaction.

(3) Finally, the rate should be chosen such that the minimum fluidizing rate $u_L$ for the heaviest particles is exceeded and the bed is prevented from breaking down into various layers of different particle masses.

It is all the more difficult to meet this condition the larger the spectrum of particle sizes in the material in question, and can be made even more difficult if the mass of the individual solid particles changes (increases or decreases) as a result of the chemical reaction.

However, within these limiting conditions, which have to be determined in each individual case, an improvement in the exchange of heat and material in the fluidized bed allows an increase in gas flow rate and throughput of solids and therefore an increase in the performance of a fluidized bed reactor in terms of the volume of the unit and the time in operation. According to the knowledge available, these improvements in the thermal and mechanical properties of the fluidized bed can be achieved by adding to the bed a second solid material which, under the conditions in question, is inert and has different physical properties (particle mass, particle size, spectrum of particle size, bulk density).

This way the properties of a fluidized bed in which solid carbon is reacted with gases containing sulphur dioxide to reduce the latter to sulphur, are improved by adding an inert solid dilution agent to the bed. This dilution agent was selected on the basis of its wear resistance; apart from sand, alumina, magnesium oxide, alumino silicates, quartz or silicon carbide was employed. Under the given conditions the inert material had an average particle size between 150 and 1500 microns and the amount in the bed throughout the whole of the reaction was maintained at 90–99.9 wt.%.

Although the particle mass of the carbon fell continuously as a result of chemical conversion, this method allowed gas flow rates of over 30.5 cm/sec to be maintained. Also, the tendency of the carbon to agglomerate during the reaction could be effectively countered. At the same time it was noted that, as a result of the measures taken, the fluidized bed was more stable and had a more uniform temperature distribution (German Pat. No. 27 54 819).

For the same reason an inert material with a particle size of >300 microns was added to a fluidized bed containing polymerides of ethylene or propylene in the form of a powder with a particle size of 1–300 microns. These were converted by gaseous chlorine to chlorinated poly-α-olefines. The preferred inert material added was polytetrafluoroethylene (PTFE) and this in a ratio of 0.1:1 to 10:1 to polyolefine powder. The reaction took place between 60° and 145° C. Although the mass of the individual particles of the reagents changed during the reaction as a result of chemical conversion, excellent throughput rates and high utilization of chlorine were achieved; without the inert additive the reaction could not be carried out even at 90° C. as the granular polyolefine agglomerated (German Pat. No. 23 42 822).

Applying these results to the reduction of aluminum oxide by chlorination presents a number of difficulties which arise from the special physical conditions prevailing while carrying out this reaction:

Whereas it is relatively easy to achieve a high utilization factor for the gaseous reagent—as the basic chemical reaction takes place rapidly and completely at the temperatures over 500° C. normally employed for this (H. P. MUELLER, Reduzierende Chlorierung von reiner Tonerde and Bauxit, Thesis, ETH Zurich, 1976, pp. 133 ff.)—it is much more difficult to satisfy the limiting conditions with respect to minimizing the amount of solid reagent which is removed from the bed by the emerging gas, as the physical properties of the solid reagent change in a complicated manner during the process as a result of the chemical reaction. It has been found that the average particle size of the reagent containing aluminum oxide does indeed remain the same until more than 80% conversion has taken place; however the interior of the particle is removed, and therefore the mass and the density of the individual particles decrease steadily (H. P. ALDER, H. P. MUELLER, W. RICHARZ, AIME Annual Meeting 1977, p. 219). If alumina produced by the Bayer process, having a particle range between 10 and 120 microns and an average particle size of 60 to 80 microns, is employed and fed continuously to the fluidized bed, then the bed contains both fresh unreacted particles 120 microns in diameter and an amount, which can vary to a greater or lesser degree, of strongly reacted particles, the size of which can be as small as 10 microns. If the rate of carry out $u_t$ of the individual particles is calculated as a function of particle density $l_s$, one obtains:

$$u_t = \frac{g(l_s - l_g)d_p^2}{18\mu} \text{ for } Re_p < 0.4 \quad (1)$$

and $$u_t = \left\{ \frac{4}{225} \cdot \frac{(l_s - l_g)^2 g^2}{l_g \cdot \mu} \right\}^{\frac{1}{3}} d_p, \text{ for } 0.4 < Re_p < 500, \quad (2)$$

where g is the force of gravity, $l_g$ the density of the gas in the fluidized bed, $d_p$ the diameter of the solid particle and $\mu$ is the viscosity of the gas (see D. KUNII/O. LEVENSPIEL, Fluidization Engineering, New York 1969, p. 76). From this it can be seen immediately that under the given conditions the flow rates for carry out of the largest and the smallest particles can differ by a factor of 2000 (0.03 cm/sec and 62 cm/sec).

Similar difficulties arise in connection with the minimum flow rate $u_L$ to achieve fluidizing conditions. If this is calculated as follows:

$$u_L = \frac{(\phi_s d_p)^2}{150} \cdot \frac{(l_s - l_g)}{\mu} \cdot \frac{\epsilon_L^3}{(1 - \epsilon_L)} \cdot g, \quad (3)$$

where $\phi$ is a shape factor and $\epsilon_L$ is the volume between individual particles at the point of fluidization, it can be seen that, with the largest variation in particle size amounting to a factor of 12 (120 microns and 10 microns), the minimum flow rates for fluidization vary by a factor of about 1500. These conditions make the choice of a suitable gas flow rate extremely difficult for the following reasons:

(a) On the one hand the gas flow rate should be much higher than the minimum fluidizing rate $u_L$ for the heaviest particles to prevent the bed from separating into layers.

(b) On the other hand the gas flow rate should be much lower than the rate $u_t$ which results in the carrying out of the lightest particles to minimize the removal of these from the bed and therefore the reduction in yield which this would produce.

In view of these difficult conditions it was an object of the present invention to increase as much as possible the specific space-time-yield of a given fluidized bed reactor in which the chlorination reduction of aluminum oxide is carried out. At the same time it was a further object of the invention to keep as high as possible the utilization factor of the gaseous reagent, expressed as a low concentration of unreacted gas. Furthermore, it is desired to diminish the amount of unreacted solid containing aluminum oxide which is carried out of the bed and to prevent the particles of different weight in the bed from segregating, and this during the full duration of the process. These and other objects of the invention will be obvious from the following description.

SUMMARY OF THE INVENTION

The foregoing objects are achieved by way of the present invention using reducing and chlorinating gases or gas mixtures wherein (a) to make up the fluidized bed, a chemically and physically inert solid dilution agent is added to the aluminum oxide bearing substances in an amount equal to 10–90 wt.% of the total weight, and such that the aluminum oxide bearing reaction partner and the solid dilution agent have comparable average particle sizes and bulk densities at the start of the process, and (b) the solid dilution agent, as a result of the chemical conversion of the aluminum oxide bearing substance, becomes a component in the fluidized bed with a larger average particle size and weight than the reaction partner, and (c) during the reducing and chlorinating process, the flow rate of the gases in the fluidized bed reactor is set at a value of 20–100 times the minimum rate required to fluidize the aluminum oxide bearing reaction partner corresponding to a range between 2 and 30 cm/sec.

The conversion of carbon coated aluminum oxide containing substances in accordance with the present invention is such that (a) to form the fluidized bed, a chemically and physically inert solid dilution agent is added to the carbon coated aluminum oxide bearing substances in an amount equal to 10-90 wt.% of the total weight, and such that the carbon coated aluminum oxide bearing reaction partner and the solid dilution agent have comparable average particle sizes and bulk densities at the start of the process, and (b) during the chlorination process, the flow rate of the gases in the fluidized bed reactor is set at a value of 20-100 times the minimum rate required to fluidize the carbon coated reaction partner corresponding to a range between 2 and 30 cm/sec.

When a process according to the present invention is employed, the gaseous reagent reacts fast with the aluminum oxide and is converted with high conversion factors to aluminum chloride, the specific space-time-yield of a given fluidized bed reactor is considerably improved, by at least 60-65%, the process can be continuously controlled by the appropriate regulation of the aluminum oxide additions, and a higher purity of aluminum chloride can be readily obtained.

The present invention also prevents to a large degree aluminum oxide particles, which have already reacted and are therefore light, from being blown out of the fluidized bed, and effectively counters the risk of the bed separating into layers as a result of the large mass and density differences in the particles of the aluminum oxide bearing reagent.

DETAILED DESCRIPTION

The mode of operation of the present invention will now be explained by way of example of the chlorinating reduction of industrial grade aluminum oxide. By way of preference the aluminum oxide bearing starting material employed was the product obtained by the Bayer process. Of course other aluminum oxide forms, suitably activated, can also be employed. The non-calcined aluminum hydroxide employed here (hydrated alumina $Al(OH)_3$ obtained by extraction with caustic soda from bauxite and then crystallization usually has a particle distribution of 10-120 microns with an average particle size of 60-80 microns. This technical grade aluminum hydroxide is converted to an activated form $(Al_2O_x\text{-}(OH)_y)$ in a dry or moist atmosphere by heating to 350°-900° C. for an appropriate interval of up to 48 hours at most. The internal surface area of the active aluminum oxide is then 100 to 450 m²/g and the residual water content 0.5 to 1 wt.% with respect to $Al_2O_3$, whereby it has been shown that there must always be a certain level of residual water for the activation. This activated aluminum oxide has a very distorted crystal structure and a negligible concentration of inactive starting material (in connection with this activation of the aluminum oxide see the German Pat. Nos. 25 40 063 and 25 40 064 both assigned to the assignee of the present invention). Besides this activated alumina, other aluminum oxide bearing substances can also be employed with the process of the invention, bauxite for example.

Such activated forms of alumina can be coated with carbon by pyrolytic cracking hydrocarbons in a fluidized bed at temperatures over 750° C. The upper temperature limit for this cracking process is given by the instability of the reactive form of the aluminum oxide which lies at about 850° C. This coating can be carried out by using hydrocarbons which are liquid or gaseous at room temperature. By employing gaseous hydrocarbons the rate of coating is higher the less saturated the hydrocarbon in question. Scanning electron microscope pictures show no difference between coated and uncoated particles, from which it can be concluded that the carbon is homogeneously deposited in the interior of the particles. Such coated forms of alumina contain 15-24 wt.% of carbon.

The solid dilution agent must be such that the course of the reaction is not negatively affected, i.e. it should not react to any great extent with the aluminum oxide and with the chlorinating and reducing gas or with the chlorinating gas or gas mixture. This dilution agent material should exhibit high wear resistance so that the particle size ratio in the fluidized bed will not change during the reaction. Because of its easy availability, quartz sand with a true density of 2.4 g/cm³ or corundum with a true density of 3.97 g/cm³ or a mixture thereof, if desired, is a preferred dilution agent. In the process according to the present invention however other dilution agent materials such as corundum, magnesium oxide, quartz, silicon carbide, aluminum magnesium spinel etc. can be employed, also hollow balls of various particle sizes can produce extremely good results.

Additions to the solid dilution agent are not critical, with the exception that at all times there must be sufficient solid dilution agent particles to maintain the desired result of improving the thermal and mechanical properties of the fluidized bed. In this respect it was found advantageous to operate with an amount of solid dilution agent which constitutes at all times 10-90 wt.% of the total solid material in the bed. The relative amount of aluminum oxide bearing reagent is determined basically by the desired conversion factor of the gas employed, i.e. there must always be such an excess of aluminum oxide that it is possible to achieve substantial conversion of the gas available. The relative amount of aluminum oxide in the bed is affected by other factors viz., the form, purity and the activation of the same. Accordingly, the optimum composition of the bed can be varied as the case requires. The particle size of the solid dilution agent depends on various factors. It has been found that, when using industrial grade aluminum oxide produced by the Bayer process and having a range of particle sizes between 10 and 120 microns, a solid dilution agent of particle size between 60 and 200 microns is suitable for use with the process of the invention. However this particle size could vary as a function of the other factors mentioned. Since the amount of aluminum oxide in the bed is relatively small compared with the dilution material, the particle size of the aluminum oxide has a smaller effect on the fluidizing of the whole bed.

The upper limit of ca. 120 microns to the particle size of the inert dilution material results from the consideration that the average diameter of the dilution material should not significantly exceed the diameter of the largest unreacted aluminum oxide particles, in order to avoid substantially different minimum fluidizing gas flow rates ($u_L$) for both components. The bulk density of the inert dilution material should be higher than that of the aluminum oxide bearing reagent (0.2-0.9 g/cm³), but not so high that the fluidized bed separates out into layers. The optimum range for this was found experimentally to be between 0.4 and 1.8 g/cm³.

The lower limit of ca. 60 microns results from the consideration that the diameter of the dilution material should not be significantly below the average particle size of the aluminum oxide (60-80 microns), so that the choice of gas flow rate does not require the carry out of dilution material to be taken into consideration, but solely the carry out of reacted aluminum oxide. Furthermore, the choice of such a lower limit should ensure a thermodynamically and mechanically favorable relationship between coarse and fine grained components for as much as possible of the reacting aluminum oxide, in particular when this is coated with carbon.

As a result of these measures, the knowledge of the effect of mixing in a second, coarser grained material to the bed is fully exploited inasmuch as, due to the chemical conversion of the aluminum oxide, the average particle size of the active reagent steadily falls or, in continuous operation, reaches a specific equilibrium value, whereas the average particle size of the inert component remains unchanged. During the reaction in the fluidized bed therefore, a system with two components of different average particle sizes is achieved which corresponds completely to the above mentioned conditions after adding a material with coarser (or finer) particle size to a fluidized bed and, with respect to the properties of the bed-in particular exchange of heat and material-considerably improves the bed over that of a system containing no dilution material.

The chlorination is carried out in fluidized bed reactors of generally known design and construction:

(a) A gas mixture preferably of chlorine/carbon monoxide or phosgene is employed as the chlorinating/reducing gas or gas mixture for uncoated aluminum oxide particles. The reaction temperature was varied between 350° C. and 800° C., whereby a range of 400°-600° C. was found to be optimum. With chlorine/carbon monoxide the ratio of gases in the mixture can vary from 90 mole percent chlorine/10 mole percent carbon monoxide to 10 mole percent chlorine/90 mole percent carbon monoxide; a preferred gas mixture however is one in which the chlorine and the carbon monoxide are present in equi-molar concentrations. The gas mixture can be diluted with an inert carrier gas such as nitrogen, noble gases etc.

The chlorination of carbon coated aluminum oxide particles is carried out in a temperature range of 450°-800° C., preferably 630°-800° C. This range resulted from the knowledge that the enthalpy of the reaction:

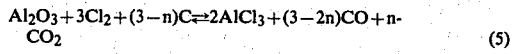

$$Al_2O_3 + 3Cl_2 + (3-n)C \rightleftharpoons 2AlCl_3 + (3-2n)CO + nCO_2 \quad (5)$$

is very temperature dependent, and the equilibrium between CO and $CO_2$ exerts a certain influence on the reaction (see TREADWELL/TEREBESI, supra). The chlorinating gases can be, for example, sulphur dichloride, phosgene, nitrosylchloride, but above all chlorine. The gas can be diluted with an inert carrier gas such as nitrogen, noble gases etc.

The aluminum oxide bearing reagent can either be fed continuously in a known manner (e.g. screw feed facility), or weighed out at the start of the reaction, if a batch process is used.

It is recommended to provide, next to the reaction chamber, a settling space in which the linear velocity of the gas stream is markedly reduced and from which any material carried out with the gas can be returned to the reaction chamber without having to leave the reactor system. The aluminum chloride formed is condensed out of the gas phase in a conventional manner and the non-condensible waste gas partly recirculated, to a certain extent via an appropriate purification stage.

EXAMPLE 1

58.8 kg of activated alumina with a particle size of 10-120 microns was charged to a fluidized bed reactor 30.8 cm in diameter and 2 m high and having on top a settling space 50 cm in diameter and 150 cm long. The average particle size was 60 microns and the BET surface area 140 $m^2/g$. The bulk density of the alumina was 0.80 $g/cm^3$, which, before fluidizing, corresponds to a bed height of 98 cm. The fluidized bed was heated to 590° C. and the throughput of chlorine and carbon monoxide increased stepwise. Alumina was added continuously in keeping with the consumption of chlorine. Table 1 shows that there was a definite change in the reaction gas at about 20 kg of chlorine per hour, clearly indicated by a high chlorine content in the exit gas and a high carry out of alumina.

EXAMPLE 2

The same grade of alumina as was used in the first example was employed here. However quartz sand, average particle size 95 microns and bulk density 1.33 $g/cm^3$, was added to the bed as dilution agent. The total initial charge comprised 51.7 kg quartz sand (63 wt.%) and 30.3 kg active alumina (37 wt.%). The chlorination was again carried out at 590° C., the throughput of chlorine and carbon monoxide being increased stepwise. Table 1 shows that in the same reactor considerably greater throughput was possible along with reduced carry out of alumina and a lower concentration of chlorine in the exit gas. This is particularly clear in terms of the specific throughput of alumina. Further, it was noted that the height of the bed changed only slightly and did not encroach on the settling space, that the temperature was uniform throughout the bed, and that the trial as a whole proceeded without difficulty.

Whereas the break down in the fluidized bed without dilution material occurred at a chlorine throughput of only 15.8 kg/h and at an alumina throughput of 2.33 $t/m^2d$, the same event when the inert material had been added did not occur until the chlorine throughput was 25.9 kg/h and the alumina throughput was 3.83 $t/m^2d$.

The optimum gas flow rate immediately prior to the change over to pneumatic transport, and ensuring quantitative conversion of the gaseous reagent, lay in the range of twenty to one hundred times that of the minimum fluidizing flow rate, corresponding to a range between 2 and 30 cm/sec. In other words, the addition of the inert material permits the efficiency of the fluidized bed employed to be increased, in terms of time and volume, by around 65%. The inert dilution agent can amount to 10-90% of the weight of the mixture; the maximum improvement however was achieved when the quartz sand made up 30 to 70%. Similar effects were achieved by the addition of 50-80 wt.% corundum (average particle size $d_p=93$ microns).

For thermodynamic reasons it can be useful in individual cases to employ either pure phosgene or mixtures of phosgene with chlorine/carbon monoxide, instead of using the equimolar mixture of chlorine and carbon monoxide. This conclusion is reached from the consideration that reaction (1) with carbon monoxide and chlorine takes place with a negative enthalpy of −354 kJ/Mol and is strongly exothermic, whereas reaction (2) with phosgene exhibits a reaction enthalpy of −29 kJ/Mol and therefore develops much less heat as it proceeds. To avoid the problems which are associated with the development of excessive heat in a fluidized bed, it can be useful to convert the chlorine/carbon monoxide mixture to phosgene before feeding it to the reactor and to remove the heat released by this reaction. This conversion is carried out in a suitable reactor containing preferably activated carbon at a relatively low temperature (below 400° C.). If, instead of pure phosgene, mixtures of phosgene and chlorine/carbon monoxide are employed, then the heat developed in the fluidized bed can be regulated in advance to take into account any specific problems this might cause. The mixing of the two gaseous components is usefully undertaken via a by-pass facility. The chlorination in the fluidized bed using phosgene or mixtures of phosgene and chlorine/carbon monoxide is conducted preferably in a temperature range of 400°–650° C.

EXAMPLE 3

58.8 kg of alumina of the same grade as in example 1 was charged to the same fluidized bed reactor and heated to 490° C. The chlorination of the alumina was carried out using phosgene which had been produced by previously reacting chlorine and carbon monoxide with activated carbon. The throughput of phosgene was increased stepwise, and the alumina continuously fed into the bed in keeping with the consumption of phosgene.

Table 2 shows a definite break through of the reaction gases at about 50 kg/h, characterized by a high concentration of phosgene in the exit gas and a high carry out of alumina. The low bulk density of the partly reacted alumina led, as in the first example, to a pronounced expansion of the bed throughout the reactor and into the settling space.

EXAMPLE 4

The same grade of alumina as in the first example was employed here. However corundum with an average particle size of 94 microns and a bulk density of 1.54 g/cm$^3$ was added as a dilution agent. The total initial charge comprised 70.7 kg corundum (70 wt.%) and 30.3 kg alumina (30 wt.%). The chlorination took place at 490° C. with stepwise increment of the throughput of phosgene. Table 2 shows that in the same reactor significantly higher output can be achieved with lower carry out of alumina and a lower concentration of phosgene in the exit gas.

These experiments show that the dilution agent has an analogous effect with phosgene to that shown with chlorine/carbon monoxide in the previously described experiments: Whereas without the addition of dilution material the gas flow rate could be increased to a phosgene throughput of only 45 kg/h and the alumina throughput to only 4.71 t/m$^2$d without breaking the above mentioned limiting conditions (complete conversion of alumina, no pneumatic transport), the addition of coarse dilution material enabled the gas flow rate to be increased, without breaking these conditions, to a phosgene throughput of 71.1 kg/h and the alumina throughput to 7.49 t/m$^2$d. The optimum gas flow rate, when inert dilution agent was present, lay in a range between 8 and 20 cm/sec. This corresponds to an increase in the efficiency of the fluidized bed reactor of 58 and 59% with respect to time and volume factors respectively. Again the amount of inert material can constitute between 10 and 90 wt.% of the total mixture, the maximum rate of improvement being achieved when this amount lies between 30 and 70%.

EXAMPLE 5

Pure alumina particles from bauxite treated in the Bayer process, having a particle size ranging from 10 to 120 microns and an average particle size of 60 microns, were activated thermally at 800° C. This activated alumina which had a specific surface area of 124 m$^2$/g was coated with carbon by thermally cracking ethylene in a fluidized bed at 800° C. The carbon content of the product was 19 wt.% and the specific surface area 70 m$^2$/g.

An initial charge of 70 kg of this carbon coated active alumina was placed in a fluidized bed reactor which was 30.8 cm in diameter and 2 m high and had a settling space 50 cm in diameter and 150 cm long set on top of it. The bulk density of the carbon coated alumina was 0.95 g/cm$^3$, which gave a bed height of 98 cm before fluidizing. This bed was heated to 700° C. and the chlorine input increased stepwise. Carbon coated alumina was fed continuously into the unit in keeping with the consumption of chlorine.

Table 1 shows a clear breakthrough of chlorine occurred at about 38 kg of chlorine per hour, corresponding to a gas flow rate of 83 times the minimum flow rate required to fluidize the bed. This breakthrough was characterized by a high chlorine content in the exit gas and a high carry out of alumina.

EXAMPLE 6

The same carbon coated alumina as in example 5 was employed here. However, corundum powder with an average particle size of 95 microns and a bulk density of 1.54 g/cm$^3$ was added as dilution agent. The total initial charge comprised 72.0 kg corundum (66 wt.% of charge) and 37.1 kg carbon coated active carbon (34 wt.%). The chlorination was carried out at 700° C. and the input of chlorine again increased stepwise.

Table 3 shows that in the same fluidized bed reactor a significantly higher throughput of chlorine could be achieved along with low carry out of alumina and a low concentration of chlorine in the exit gases. This is particularly clear from the throughput of alumina for which the non-converted amount of chlorine is already taken into consideration. In these trials it was found that the height of the bed changed only slightly and did not encroach on the settling space, that the temperature was uniform throughout the whole of the reactor bed, and that the trial could be carried out without any interruptions.

Whereas the breakthrough in the fluidized bed in these trials without any dilution agent being present occurred at a chlorine throughput of only 37.6 kg/h and at an alumina throughput of 5.09 t/m$^2$d (corresponding to a gas flow rate of 15.8 cm/sec or 83 times the minimum rate for fluidizing the charge in the reactor), the same event in the presence of dilution material did not occur until the chlorine throughput was 63.3 kg/h and the alumina throughput was 8.6 t/m$^2$d, which corresponds to a gas flow rate of 26.6 cm/sec or 48 times the minimum flow rate to achieve fluidizing of the bed. The use of the solid dilution agent allowed the efficiency of the fluidized bed reactor, with respect to time and volume to be increased by around 70%. It was found that, whereas significant improvements were obtained in the whole range between 10 and 90%, the highest rate of increase was achieved with 30–70 wt.% dilution agent. A comparable effect was attained with an average particle size of 93 μm and 40 to 65 wt.% of quartz sand.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

TABLE 1

Reduction/chlorination of aluminum oxide with an equimolar gas mixture of carbon monoxide (CO) and chlorine ($Cl_2$) in a fluidized bed

| Gas flow rate | | Throughput of $Cl_2$ kg/h | Throughput of alumina ($t/m^2d$) | Bulk density ($g/cm^3$) of aluminum oxide or mixtures | Carry out of alumina (% of input) | Chlorine content in exit gas (% of input) |
|---|---|---|---|---|---|---|
| cm/sec | multiples of $u_L$ | | | | | |
| Example 1: Fluidized bed comprising 60 microns aluminum oxide without addition of coarser material | | | | | | |
| 2.3 | 36 | 3.16 | 0.49 | 0.19 | 6.3 | 0 |
| 6.6 | 68 | 9.08 | 1.39 | 0.28 | 7.6 | 1.2 |
| 11.5 | 92 | 15.8 | 2.33 | 0.40 | 10.3 | 4.7* |
| Example 2: Addition of 63% quartz sand (95 microns) to a fluidized bed of 60 microns aluminum oxide | | | | | | |
| 14.9 | 41 | 20.5 | 3.07 | 0.95 | 7.9 | 2.9 |
| 18.8 | 43 | 25.9 | 3.83 | 1.07 | 12.7 | 4.3 |
| 23.4 | 45 | 32.3 | 4.53 | 1.14 | 16.1 | 9.2* |
| 27.2 | 48 | 37.5 | 5.04 | 1.21 | 19.8 | 12.9* |

*Breakthrough of fluidized bed

TABLE 2

Reduction/chlorination of aluminum oxide with phosgene in a fluidized bed

| Gas flow rate | | Throughput of phosgene kg/h | Throughput of alumina $t/m^2d$ | Bulk density ($g/cm^3$) of aluminum oxide or mixtures | Carry out of alumina (% of input) | Phosgene content in exit gas (% of input) |
|---|---|---|---|---|---|---|
| cm/sec | multiples of $u_L$ | | | | | |
| Example 3: Fluidized bed comprising 60 microns aluminum oxide without addition of coarser material | | | | | | |
| 2.0 | 36 | 8.83 | 0.98 | 0.20 | 6.1 | 0 |
| 6.2 | 72 | 26.9 | 2.93 | 0.29 | 7.7 | 1.7 |
| 10.3 | 95 | 45.0 | 4.71 | 0.39 | 11.2 | 5.4* |
| Example 4: Addition of 70% corundum (95 microns) to a fluidized bed of 60 microns aluminum oxide | | | | | | |
| 12.2 | 28 | 52.9 | 5.67 | 1.29 | 7.5 | 3.2 |
| 16.3 | 33 | 71.1 | 7.49 | 1.30 | 11.9 | 4.8* |
| 20.3 | 35 | 88.3 | 8.67 | 1.32 | 17.1 | 11.3* |

*Breakthrough of fluidized bed

TABLE 3

Reduction/chlorination of carbon coated aluminum oxide with chlorine ($Cl_2$) in a fluidized bed

| Gas flow rate | | Throughput of chlorine kg/h | Throughput of alumina $t/m^2d$ | Bulk density of solids $g/cm^3$ | Carry out of alumina (% of input) | Chlorine content in exit gas (% of input) |
|---|---|---|---|---|---|---|
| cm/sec | multiples of $u_L$ | | | | | |
| Example 1: Bed of 60 microns aluminum oxide without dilution material | | | | | | |
| 2.8 | 31 | 6.64 | 1.02 | 0.22 | 6.4 | 0.1 |
| 8.0 | 59 | 19.0 | 2.88 | 0.32 | 8.1 | 1.9 |
| 13.1 | 78 | 31.3 | 4.60 | 0.44 | 12.2 | 4.9 |
| 15.8 | 83 | 37.6 | 5.09 | 0.57 | 14.1 | 12.3* |
| Example 2: Bed of 60 microns aluminum oxide with 66% corundum (95 microns) as dilution agent | | | | | | |
| 15.8 | 39 | 37.6 | 5.62 | 1.34 | 8.5 | 3.2 |
| 21.3 | 47 | 50.6 | 7.35 | 1.38 | 12.1 | 5.9 |
| 26.6 | 48 | 63.3 | 8.60 | 1.44 | 18.0 | 12.0* |

*Breakthrough of fluidized bed

What is claimed is:

1. A continuous process for producing aluminum chloride from aluminum oxide bearing substances in a fluidized bed comprising:
   (a) preparing a fluidized bed of an aluminum oxide bearing substance having a range in particle size of from about 10 to 120 microns and a bulk density of from about 0.2 to 0.9 g/cm² and a chemically and physically inert solid dilution agent having a range of particle size of from about 60 to 200 microns and a bulk density of from about 0.4 to 1.8 g/cm² wherein the solid dilution agent is in an amount equal to 10 to 90 weight percent of the total weight of the fluidized bed;
   (b) heating said bed at a temperature of up to 800° C.; and
   (c) reducing and chlorinating said fluidized bed with a reducing and chlorinating gas or mixtures thereof at a gas flow rate of from about 2 to 30 cm/sec whereby the solid dilution agent has a larger average particle size and bulk density than said aluminum oxide bearing substance as a result of the chemical conversion of said aluminum oxide bearing substance into aluminum chloride.

2. A process according to claim 1 wherein the reducing and chlorinating gases or gas mixtures are chlorine, carbon monoxide and/or phosgene.

3. A process according to claim 2 wherein the solid dilution agent in the fluidized bed is selected from the group consisting of corundum, quartz, magnesium oxide, aluminum-magnesium spinel, silicon carbide, or mixtures thereof, such that at the start of the reaction the dilution agent constitutes about 30–70 weight percent of the total weight of the particulate solid in the bed.

4. A process according to claim 1 wherein the aluminum oxide bearing substance is added continuously throughout the whole duration of the reaction so that the average particle diameter of the aluminum oxide bearing substance is maintained slightly under the starting value.

5. A process according to claim 1 wherein phosgene is used as the chlorinating and reducing gas, 30 to 70 weight percent corundum of average particle size 94 microns is used as the dilution agent and the reaction is carried out at 490° C. and with a gas flow rate of over 20 cm/sec.

6. A continuous process for producing aluminum chloride from aluminum oxide bearing substances coated with carbon in a fluidized bed comprising:
(a) preparing a fluidized bed of an aluminum oxide bearing substance coated with carbon having a range in particle size of from about 10 to 120 microns and a bulk density of from about 0.2 to 0.9 g/cm$^2$ and a chemically and physically inert solid dilution agent having a range of particle size of from about 60 to 200 microns and a bulk density of from about 0.4 to 1.8 g/cm$^2$ wherein the solid dilution agent is in an amount equal to 10 to 90 weight percent of the total weight of the fluidized bed;
(b) heating said bed at a temperature of up to 800° C.; and
(c) chlorinating said fluidized bed with a chlorinating gas or mixtures thereof at a gas flow rate of from about 2 to 30 cm/sec.

7. A process according to claim 6 wherein the aluminum oxide bearing substance coated with carbon is alumina which is brought into an active form by dehydrating at 500° to 800° C. such that the residual water content is 0.5–1.0 weight percent and the specific internal surface area is 10–450 square meters per gram of aluminum oxide.

8. A process according to claim 6 wherein the solid dilution agent in the fluidized bed is selected from the group consisting of corundum, quartz, magnesium oxide, aluminum-magnesium spinel, silicon carbide, or mixtures thereof, such that at the start of the reaction the dilution agent constitutes about 30–70 weight percent of the total weight of the particulate solid in the bed.

9. A process according to claim 8 wherein the chlorinating gas is selected from the group consisting of chlorine, sulphur di-chloride, phosgene, nitrosylchloride or mixtures thereof.

* * * * *